(12) United States Patent
Hotchkies

(10) Patent No.: US 9,734,035 B1
(45) Date of Patent: Aug. 15, 2017

(54) DATA QUALITY

(71) Applicant: Amazon Technologies, Inc., Reno, NV (US)

(72) Inventor: Blair Livingstone Hotchkies, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 14/268,900

(22) Filed: May 2, 2014

(51) Int. Cl.
*G06F 11/00* (2006.01)
*G06F 11/34* (2006.01)

(52) U.S. Cl.
CPC .............................. *G06F 11/3409* (2013.01)

(58) Field of Classification Search
CPC ............. G06F 11/3409; G06F 11/3466; G06F 11/0793; G06F 11/0751
USPC ........................................................ 714/47.1
See application file for complete search history.

(56) References Cited

U.S. PATENT DOCUMENTS

| | | | | |
|---|---|---|---|---|
| 2009/0182866 A1* | 7/2009 | Watanabe | ............ | G06F 11/3495 709/224 |
| 2013/0132854 A1* | 5/2013 | Raleigh | ................. | G06F 3/0482 715/738 |
| 2013/0346594 A1* | 12/2013 | Banerjee | ............. | G06F 11/3495 709/224 |
| 2014/0324862 A1* | 10/2014 | Bingham | .......... | G06F 17/30572 707/737 |

\* cited by examiner

*Primary Examiner* — Yair Leibovich
(74) *Attorney, Agent, or Firm* — Lee & Hayes, PLLC

(57) ABSTRACT

Functionality is disclosed herein for increasing input data quality across data targets. The mechanism disclosed herein may receive input data, aggregate and organize the input data, and determine an importance score for the organized data. The importance score may abstract both a quantitative measure and periodic measure for creating a sliding scale. The sliding scale may subsequently be used to associate desired alert information concerning data quality events at the data targets.

18 Claims, 5 Drawing Sheets

DATA QUALITY

BACKGROUND

Data processing systems are frequently utilized for processing large volumes of data. In order to provide this functionality, data processing systems may include multiple data storage targets to which input data is routed for storage and/or analysis. One form of data storage target is a data warehouse that aggregates data from many operational systems and/or data stores. Other data storage targets may include graphing tools configured to plot or graph the data, applications for organizing/querying the data, and other similar data targets. For example, input data for an online retailer may include data from many sources, including data relating to customer purchases, data relating to network page views, data relating to a catalog of products, data relating to search queries, and many other types of data. The online retailer may execute reports, perform various types of analyses, and perform other types of functions using the data from the data storage targets to determine, for example, various types of information related to a state of one or more portions of a retail system maintained by the online retailer.

As the data maintained by data processing systems is frequently utilized for many different types of engineering and business purposes, the quality of the data routed to and maintained by data storage targets such as those described above may be very important. Due to the typically large quantity of data maintained by the data storage targets, however, it can be difficult to ensure the quality of the data stored in these types of systems.

The disclosure made herein is presented with respect to these and other considerations.

DETAILED DESCRIPTION

Figure 1:
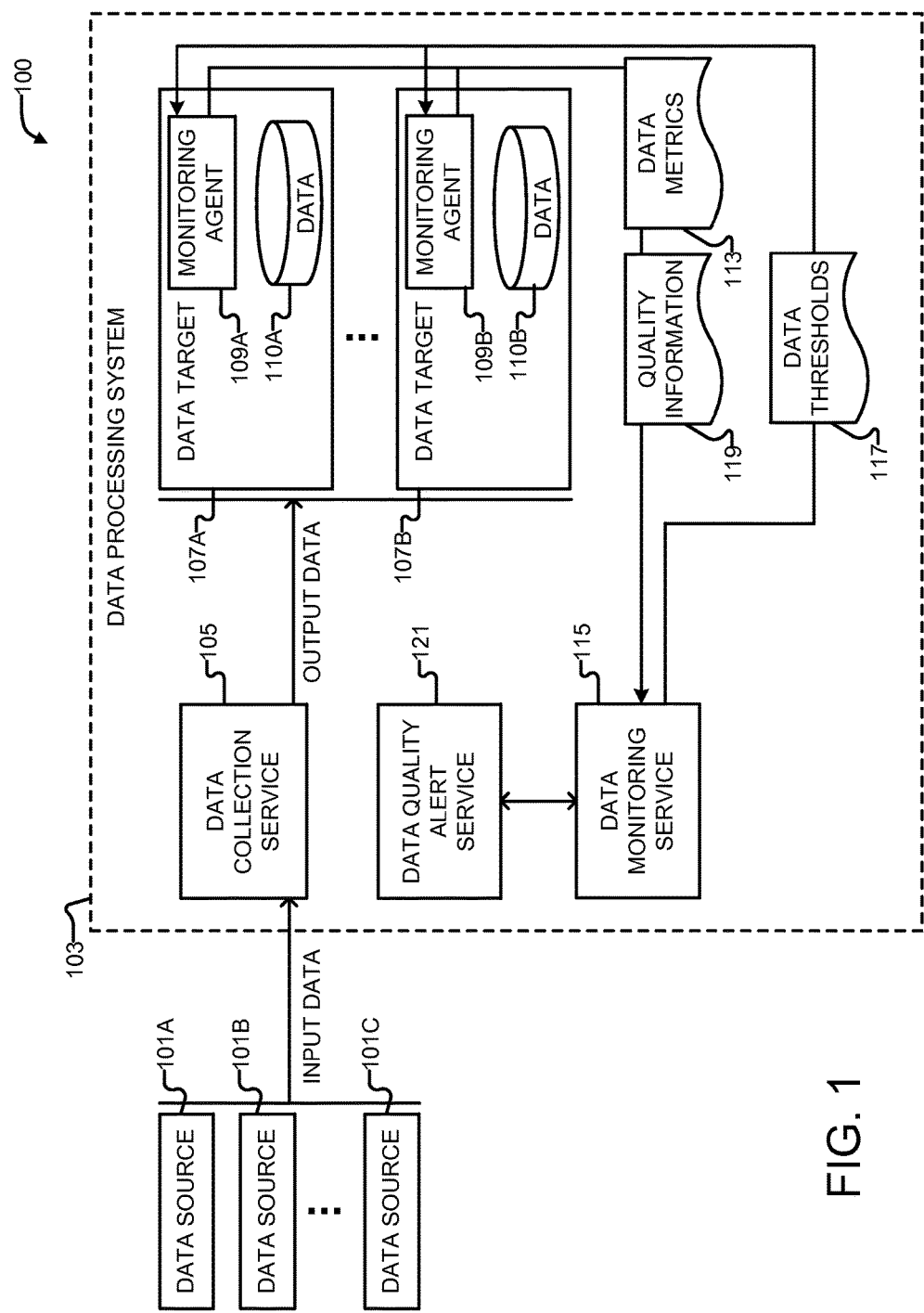
FIG. 1 is a software architecture diagram showing aspects of an illustrative data storage system, including several software and hardware components provided by embodiments presented herein.

The following detailed description is directed to technologies for improving data quality in data processing systems and related storage systems. Through an implementation of the various technologies disclosed herein, a data monitoring service can be implemented that computes and adjusts an importance score based on multiple factors related to data processed at the data processing system. The importance score may abstract both a quantitative measure and a periodic measure for creating a sliding scale for data monitoring.

The sliding scale may be used to identify data quality events at the data processing system and stabilize a rate of false-positive alerts to within acceptable limits. The sliding scale may be continually adjusted in real time or in near-real time based on data metrics received or retrieved from data targets, associated data usage logs, and other similar information.

In one implementation, individual monitoring agents are configured to relay data metrics based on various factors to the data monitoring service. The data monitoring service interprets the relayed data metrics to adjust a set of thresholds for subsequent data monitoring. The set of thresholds may include quantitative and periodic measures for determining if a data quality event has occurred. The quantitative measures may establish a range or bound for high quality data. The periodic measures may establish a sliding window during which the quantitative measures are compared to the data. Accordingly, the quantitative and periodic measures are dynamic measures that facilitate fast processing and stabilization of a rate of false positive alerts related to input data quality.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein may be practiced in data processing environments, where tasks may be performed by several computing devices that are linked through a communications network. In a data processing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a diagram showing aspects of an illustrative data storage system 100, including several software and hardware components provided by embodiments presented herein. The system 100 includes several data sources 101A, 101B, and 101C (herein referred to in the singular, "data source 101" and/or plural, "data sources 101") that are arranged to provide input data to a data processing system 103. The data sources 101 may provide one or more streams of input data related to the operational characteristics of the system 100. According to at least one embodiment, the data sources 101 are arranged outside the data processing system 103. According to other embodiments, the data sources 101 can include data sources arranged within or arranged outside the data processing system 103. Additionally, the data processing system 103 may be a portion of an online retail system, an e-commerce system, or another business-oriented system, according to some embodiments.

The data sources 101 include any suitable data sources arranged to provide input data for storage and analysis. The data sources 101 can include, for example, customer purchase data sources, network page view data sources, product catalog data sources, search query data sources, application data sources, webpage data sources, clickstream data sources, computer usage data sources, or any other desirable data sources. Each data source 101 is configured to provide associated input data across a suitable communication medium, including, for example, a network, database, or through a storage device in communication with the data processing system 103.

Customer purchase data sources can include, for example, purchase order databases for an online retailer or other sources of information pertaining to purchases initiated by a customer of a retailer of any form. Network page view data sources and webpage data sources can include, for example, log files describing access to one or more webpages, network locations, or similar sites, or other data stores containing similar data. Search query data sources can include stored access information for one or more databases or other queryable sources. Application data sources and computer usage data sources can include stored information on one or more computers related to usage of applications, software, web browsers and/or other modules originating at one or more computers, or through a distributed computing environment. Other data sources and forms of the particular data sources described above may also be applicable, and are considered to be within the scope of this disclosure.

The input data from data sources 101 is received by a data collection service 105. The data collection service 105 is configured to collect, aggregate, organize, and route the received input data as output data for storage in one or more data targets 107A and 107B (herein referred to in the singular, "data target 107" and/or plural, "data targets 107"). The data targets 107 include any suitable data targets arranged to receive output data from the data collection service and utilize the same.

The data targets 107 can include, for example, a data warehouse for storage of vast amounts of data for subsequent analysis. The data targets 107 can also include, for example, graphing tools configured to generate plots, graphs, or other representations of the output data. The data targets 107 can further include specific software applications such as spreadsheet applications, statistical applications, database applications, or other suitable software applications.

Monitoring agents 109A and 109B (herein referred to in the singular, "monitoring agent 109" and/or plural, "monitoring agents 109"), and data stores 110A and 110B (herein referred to in the singular, "data store 110" and/or plural, "data stores 110") may be included in data targets 107. It should be understood that various implementations of data targets 107 are applicable, and thus more or fewer components than those illustrated may be interpreted to be within the scope of this disclosure.

The monitoring agents 109 are configured to interpret data from the data stores 110 to generate a set of data metrics 113. Data metrics 113 are provided to a centralized data monitoring service 115. Generally, data metrics 113 include information related to the importance and usage of data stored or accessed through each data target 107. According to one embodiment, data metrics 113 include data related to how data in a data store 110 is organized or "cut" for use therein. According to an additional embodiment, data metrics 113 include data related to how often data in a data store 110 is accessed, utilized, or queried. Data metrics 113 can additionally include any suitable information related to data of a data store 110 including, for example, a volume of data queries, a measure of how valuable data is to users of the data processing system 103, a measure of how replaceable data in a data store 110 is, a measure of whether back-up sources exist for the data in a data store 110, a measure of a cost associated with replacing data in a data store 110, a latency (e.g., time when data is generated versus a time data is available for processing) associated with data in a data store 110, a measure of how often data in the data store 110 is acted upon by an organization or a portion thereof, or other information.

The data monitoring service 115 receives the data metrics 113 and interprets the data metrics 113 to generate and adjust a set of data thresholds 117. The data thresholds 117 include quantitative and periodic measures for determining if a data quality event has occurred or if a data quality event has been approached. As used herein, the phrase "data quality event" refers to an event where the data received from input sources 101 is or may be compromised, incorrect, or otherwise of questionable quality. As further used herein, the phrase "a data quality event has been approached" refers to a situation where the data received from input sources 101 has been determined to be within a predetermined range of a threshold for data quality, but not outside bounds of the threshold for data quality. A data quality event can also include other events, including, for example, events where the data received from input sources 101 deviates from predicted values, deviates from expected values, fluctuates beyond established data thresholds 117, or any other suitable events.

The quantitative measures of the data thresholds 117 establish a range or bound for high quality data. For example, a range or bound may include a value for comparing received output data from the data collection service 105 and/or data store 110. The periodic measures of the data thresholds 117 may establish a sliding window during which the quantitative measures, such as the range or bounds, are compared to the output data from the data collection service 105 and/or data store 110. The sliding window may be arranged such that data is compared for the duration of the sliding window to determine if a threshold number of individual data quality events has occurred. The origin of the sliding window may slide forward and backwards such that the same data points are compared one or more times based on whether they occur during the time period of the sliding window.

As illustrated in FIG. 1, the data thresholds 117 are provided to the monitoring agents 109. The monitoring agents 109 interpret data in data stores 110, based on the data thresholds 117, to determine if a data quality event has occurred. If a data quality event has occurred, the monitoring agents 109 transmit associated quality information 119 to the data monitoring service 115. Generally, the quality information 119 includes information related to whether data quality events have occurred, how many data quality events have occurred, and any other suitable information.

The data monitoring service 115 uses the quality information 119 to determine if an alert should be triggered, and direct an alert request to data quality alert service 121. Alternatively, the data monitoring service can trigger events directly, or submit alert requests to other services not illustrated in FIG. 1. An alert request may be formed as a request for the data quality alert service 121 to issue a data quality event alert based on the quality information 119. The data quality event alert can include any suitable portions of the quality information 119 and/or other information received from the data monitoring service 115. The data quality event alert may be a message (such as an email, page, short-messaging service message, system prompt, or other message) comprising text or audio information and being directed towards one or more interested parties. The interested parties may be employees, technicians, executives, or other personnel with a need or desire to have information related to input data quality.

The data quality event alert may also include automated data cleansing routines for data accessed at the data targets 107. For example, the automated data cleansing is employed concurrently with issuing an alert message, or, alternatively, may be automatically employed prior to determining a subsequent data quality event has occurred through additional monitoring after the automated data cleansing. Other combinations of alerts and automated data cleansing may be applicable, and are within the scope of this disclosure.

The automated data cleansing can include a sequence of computer executable instructions configured to direct the data targets 107 to cleanse, repair, and/or replace data stored in data stores 110. The computer executable instructions can include any suitable script, application executables, or other forms of instructions. The computer executable instructions may also be provided through an alert message or a user interface element, for example, to allow an employee or technician to invoke the automated data cleansing.

In addition to triggering or requesting a data quality event alert and/or automated data cleansing upon receipt of the quality information 119, the data thresholds 117 can be continually adjusted during processing of data based on the quality information 119 by the data monitoring service 115. Accordingly, stabilization of a rate of false positive alerts is facilitated as related to input data quality. Thus, through stabilization of the rate of false positive alerts, a target or predetermined rate can be realized, thereby increasing data quality without over-burdening resources tailored to react to generated alerts.

Figure 2:
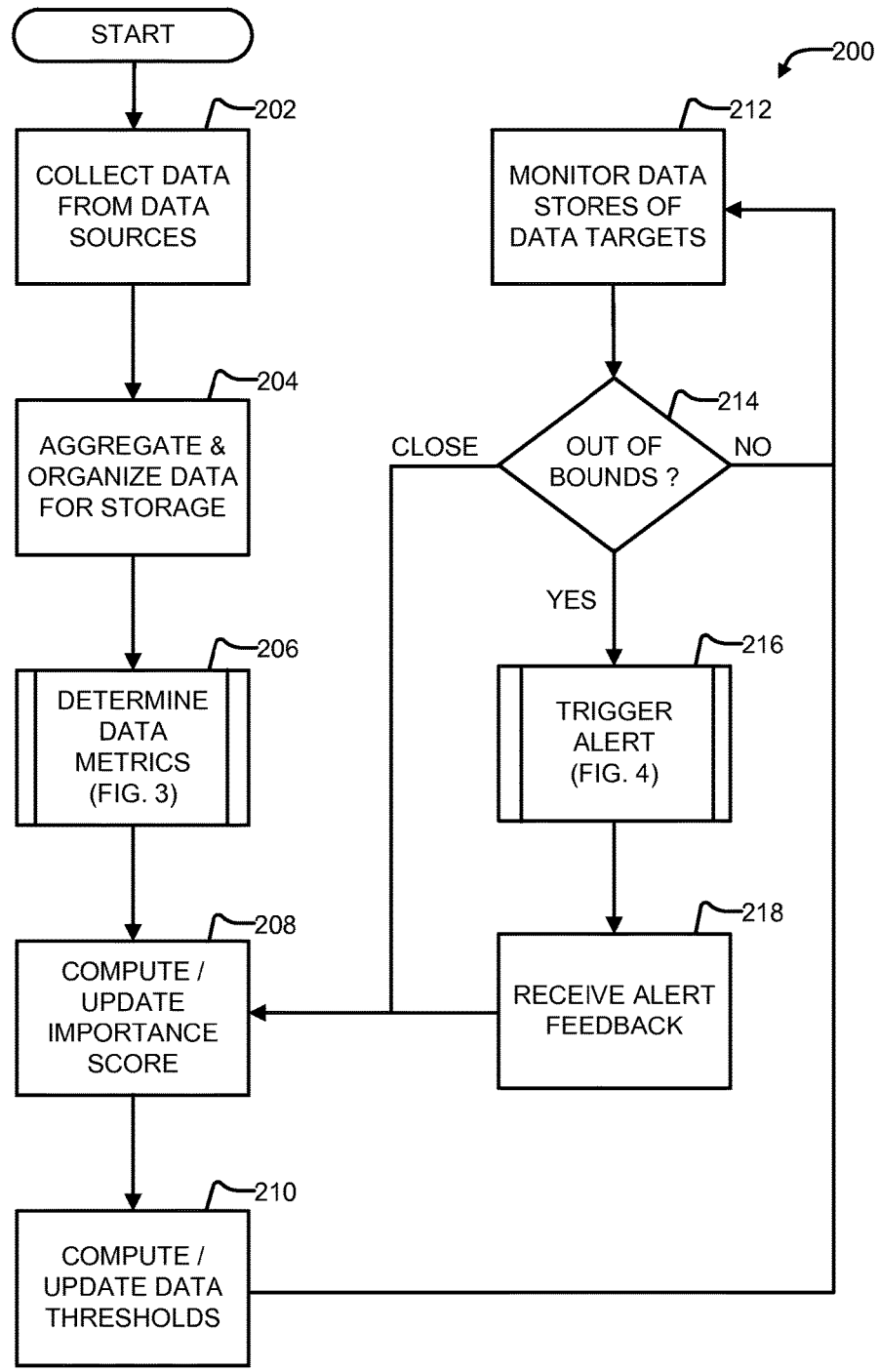
FIG. 2 is a flow diagram illustrating aspects of the operation of a data monitoring service that is configured for integration with a data storage system, according to one embodiment disclosed herein.

Additional details regarding improving data quality through processes performed by the data monitoring service 115 and/or data monitoring agents 109 are provided below with reference to FIGS. 2-4. Turning now to FIG. 2, additional details will be provided regarding the embodiments presented herein for improving data quality.

It should be appreciated that the logical operations described herein with regard to FIG. 2, and the other FIGS., are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 is a flow diagram showing a method 200 that illustrates aspects of the operation of a data monitoring service (e.g., data monitoring service 115) that is configured for integration with a data storage system (e.g., system 100), according to one embodiment disclosed herein. As shown in FIG. 2, the method 200 includes collecting data from data sources 101 at block 202.

Generally, the data collection service 105 collects input data from data sources 101. The method 200 further includes aggregating and organizing the collected data at block 204. For example, the data collection service 105 may "cut" or organize the aggregated data based on established routines for directing the organized data to one or more data targets 107. The established routines may include predetermined data processing algorithms that parse the input data to create output data that is routed to the data targets 107, as illustrated in FIG. 1.

The method 200 of FIG. 2 further includes determining data metrics 113 from the organized and routed data at block 206. For example, individual data monitoring agents 109 or the data monitoring service 115 inspects logs describing access to data stored through the data targets 107 (e.g., at data stores 110). The data metrics 113 may be generated by determining how often data is queried or accessed, by determining a volume of queries for particular data, by interpreting an importance indicator or flag (e.g., through data flagged as "important" by an administrator or technician), or by determining or interpreting other factors related to the importance of data stored at data targets 107. A more detailed description related to determining data metrics 113 is provided with reference to FIG. 3.

The method 200 of FIG. 2 further includes computing and/or updating an importance score associated with the data metrics 113 at block 208. The data monitoring service 115 may initially compute an importance score for all "cuts," portions, or groupings of data stored at the data targets 107. The importance score may be a variable having one or more values representative of the overall importance of the underlying data. The importance score may be updated continually by the data monitoring service 115.

The method 200 further includes computing and/or updating data thresholds 117, based on the importance score, at block 210. The data monitoring service 115 may initially compute the data thresholds 117 based on the computed importance score. The data thresholds 117 are based on the importance score and the type of data represented by the importance score. Thus, the data thresholds 117 can include a quantitative measure and a periodic measure, such that the importance of the data is represented both by a frequency of comparison to thresholds and the thresholds for the comparison.

The frequency of comparison, or the periodic measure, can be represented as a sliding window. The sliding window may be arranged as described above, and can be based on the type of data stored at the data target 107, its usage, and/or the data itself. If the type of data is a stream of ordering information, for example, the sliding window may include a large period for comparison. If the type of data is a delayed form of data, such as, for example, return data for items ordered through a website, the sliding window may include a relatively small window for comparison such that alerts are triggered as soon as return information is available. If the usage of the data reflects a high frequency of use, the sliding window may be adjusted to include more frequent comparisons to the thresholds. Additionally, if the data itself fluctuates, the sliding window may be adjusted to accommodate the fluctuations. Other manipulations of the sliding window are applicable to embodiments, and are considered to be within the scope of this disclosure.

The method 200 further includes monitoring data stores 110 of data targets 107 at block 212. The monitoring of the data stores 110 can be performed by individual monitoring agents 109 and/or the data monitoring service 115. The monitoring can include inspection of data logs describing access to the data stored at the data targets 107, as described above. Thus, new data metrics 113 can be generated substantially in real time for adjustment of the data thresholds 117.

Thereafter, the data monitoring service 115 (or an individual monitoring agent 109) may make a determination as to whether data of the data target 107 is close to, or out of bounds of, values established by the data thresholds 117 at block 214. Data is continually monitored through block 212 if no data is determined to be out of bounds.

If data is determined to be out of bounds, the monitoring service 115 may trigger an alert at block 216. The alert may be triggered in any suitable manner, including sending an alert request to the data quality alert service 121. The data quality alert service 121 may generate an alert message for transmission to one or more systems, technicians, users, customers, or other recipients. The alert message can take a variety of forms, and may or may not include data metrics 113, a portion of a data stream related to the alert, or other suitable information. Triggering of alerts comprising additional information (e.g., "intelligent alerts") is described more fully with reference to FIG. 4.

If data is determined to be close to values established by the data thresholds 117, but not out of bounds or exceeding the values, the data monitoring service may update an importance score and/or data thresholds 117 at blocks 208 and 210 based on the determination. For example, the importance score and/or data thresholds 117 may be reduced, rather than increased, if the data is indicative of approaching a data quality event. These adjustments further provide increased stabilization of a false-positive rate by slightly increasing the false-positive rate under some circumstances. Additionally, this determination may be performed offline or in a post-operating analysis, according to some embodiments.

If a data quality event has occurred, and subsequent to triggering the alert, the data monitoring service 115 may receive alert feedback at block 218, and update the importance score and/or data thresholds 117 at blocks 208 and 210. The alert feedback can include a target false positive rate, feedback associated with whether one or more alerts were positive or false-positive, or any other suitable information. The alert feedback can be received from one or more recipients of the generated alert message in some embodiments.

The alert feedback is taken into consideration by the data monitoring service 115 for updating the data thresholds 117, and is used to stabilize the false-positive rate while ensuring high input data quality. The false-positive rate can be stabilized to within a predetermined or desired range, or other target values, such as a target false-positive rate. Accordingly, the alert feedback and continual data monitoring allows for improving data quality, reducing use of resources in false-positive alerts, and dynamic adjustment of the data thresholds 117 to achieve desired results. Hereinafter, data monitoring for determining data metrics 113 is described more fully with reference to FIG. 3.

Figure 3:
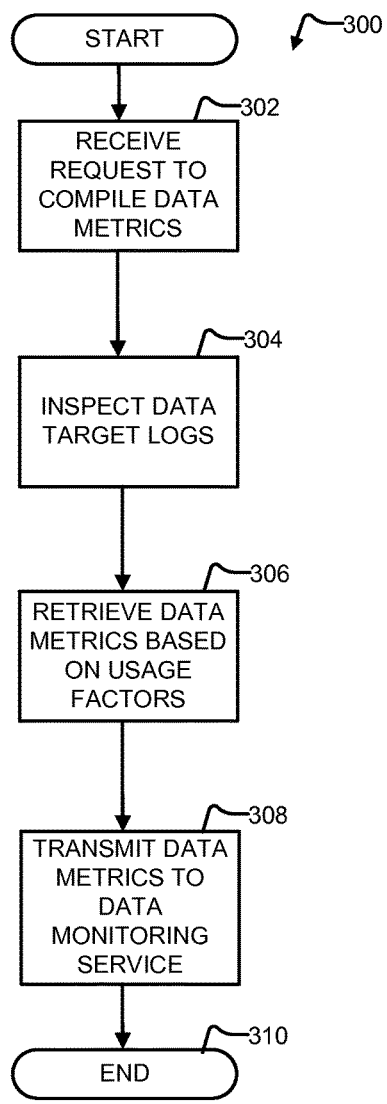
FIG. 3 is a flow diagram illustrating aspects of the operation of data monitoring agent that is configured for integration with a data target, according to one embodiment disclosed herein.

FIG. 3 is a flow diagram illustrating aspects of the operation of a data monitoring agent 109 that is configured for integration with a data target 107. It is noted that according to alternate implementations, the monitoring service 115 may operate as described with reference to FIG. 3, rather than having individual monitoring agents 109 deployed at the data processing system 103.

The method 300 includes receiving a request to compile data metrics 113 at block 302. The request may be generated at the data monitoring service 115, or the data monitoring service 115 may directly compile data metrics 113. The method 300 further includes inspecting data target logs associated with data stores 110 at block 304. The inspecting the data target logs includes determining how data stored at the target is "cut" or organized and how often the data is access or queried. The determination can be facilitated by retrieving a volume of queries, determining if the data has been previously flagged or indicated as being important, determining data usage statistics, and by other similar data usage factors.

The method 300 further includes retrieving or compiling data metrics 113 based on the data usage factors at block 306. The data usage factors described above are indicative of a level of importance of the data. Furthermore, the data usage factors describe how the data is organized, how the data is used, recipients of the data or associated reports (e.g., high-level executives), and other similar metrics for compiling the data metrics 113.

Subsequently, the data monitoring agent 109 transmits the data metrics 113 to the data monitoring service 115 at block 308. Alternatively, the data monitoring service 115 may operate as described in blocks 304 and 306, such that data metrics 113 are compiled at the data monitoring service 115. The compiled data metrics 113 may subsequently be utilized as described in FIG. 2, for example, in computing and adjusting data thresholds 117 or importance scores for creating the data thresholds 117.

Through monitoring of the data targets 107, and compiling data metrics 113 associated with usage of the data of data targets 107, alerts can be triggered having an acceptable false-positive rate. The alerts can take various forms including, for example, an intelligent alert. As used herein, the phrases "intelligent alert" or "intelligent alert message" refer to an alert triggered by the data monitoring service 115 and/or data quality alert service 121 comprising information related to possible causes of a data quality event, possible solutions to a current data quality event, previously recorded data quality events similar to a current data quality event, or other useful information. It should be understood that other forms of alerts are also applicable, and are within the scope of this disclosure.

Figure 4:
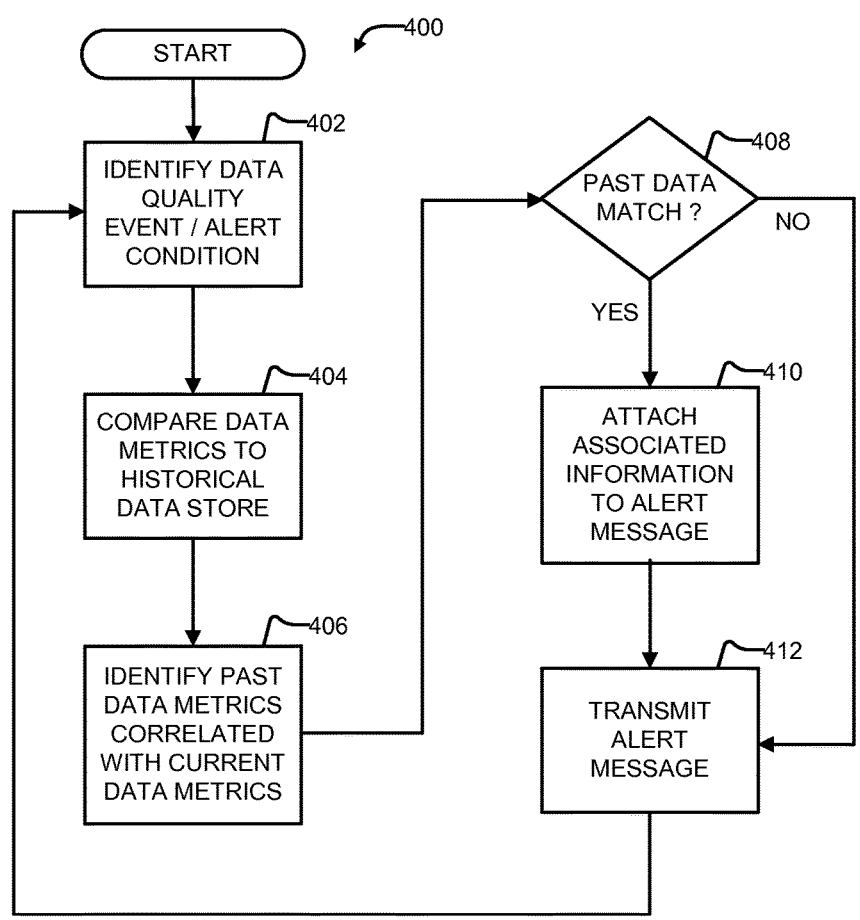
FIG. 4 is a flow diagram illustrating aspects of intelligent creation of an alert for a data storage system, according to one embodiment disclosed herein.

FIG. 4 is a flow diagram illustrating aspects of creation of an intelligent alert by the data processing system 103, according to one embodiment. As described above, vast amounts of input data from data sources 101 can be processed, stored, and analyzed. Accordingly, information related to historical data quality events may be readily accessed through the data processing system 103. According to one embodiment, the historical data is used to generate an intelligent alert such that serious data quality events are overcome more easily.

The method 400 includes identifying a data quality event from quality information 119 at block 402. The data quality event identified may be representative of an alert condition associated with an issue with infrastructure, sales, hardware, software, or other attributes of data processing system 103 or data storage system 100.

The method 400 further includes comparing data metrics 113 associated with the identified event to a historical data store 110. The comparison includes extrapolating metadata of the identified event and comparing the same to metadata associated with past or previous occurrences of data quality events.

The method 400 further includes identifying past data metrics correlated with current data metrics 113 at block 406 to determine a matching previous event. The identifying can include correlating the data metrics 113 with the past data metrics. The match may be only a partial match, for example, having a similarity of metadata above a predetermined or desired threshold.

If no matches are identified, or if no substantially similar events have previously occurred, the data monitoring service 115 may trigger a conventional data quality event alert, or transmit an alert message, at block 412. The conventional data quality event alert may include a relatively simple message generated as described above with reference to FIG. 2.

If a match is identified, the data monitoring service 115 may attach information associated with the matching prior data quality event to an alert message at block 410 to generate an intelligent alert message, and transmit the intelligent alert message at block 412. The associated information can include any useful information, including actions taken previously to restore system integrity. The associated information can also include a list of current events that may have triggered the data quality event such as, for example, a natural disaster that has damaged infrastructure or the ability for users to create input data through data sources 101. Other forms of associated information may be attached to the intelligent alert message, and are considered to be within the scope of this disclosure.

It should be appreciated that the components and services described above may be implemented as hardware, or as software, to provide functionality similar to that presented above. The services described above might also be executed upon one or more computer systems having computer architectures similar to those described below. Other computer architectures might also be utilized.

Figure 5:
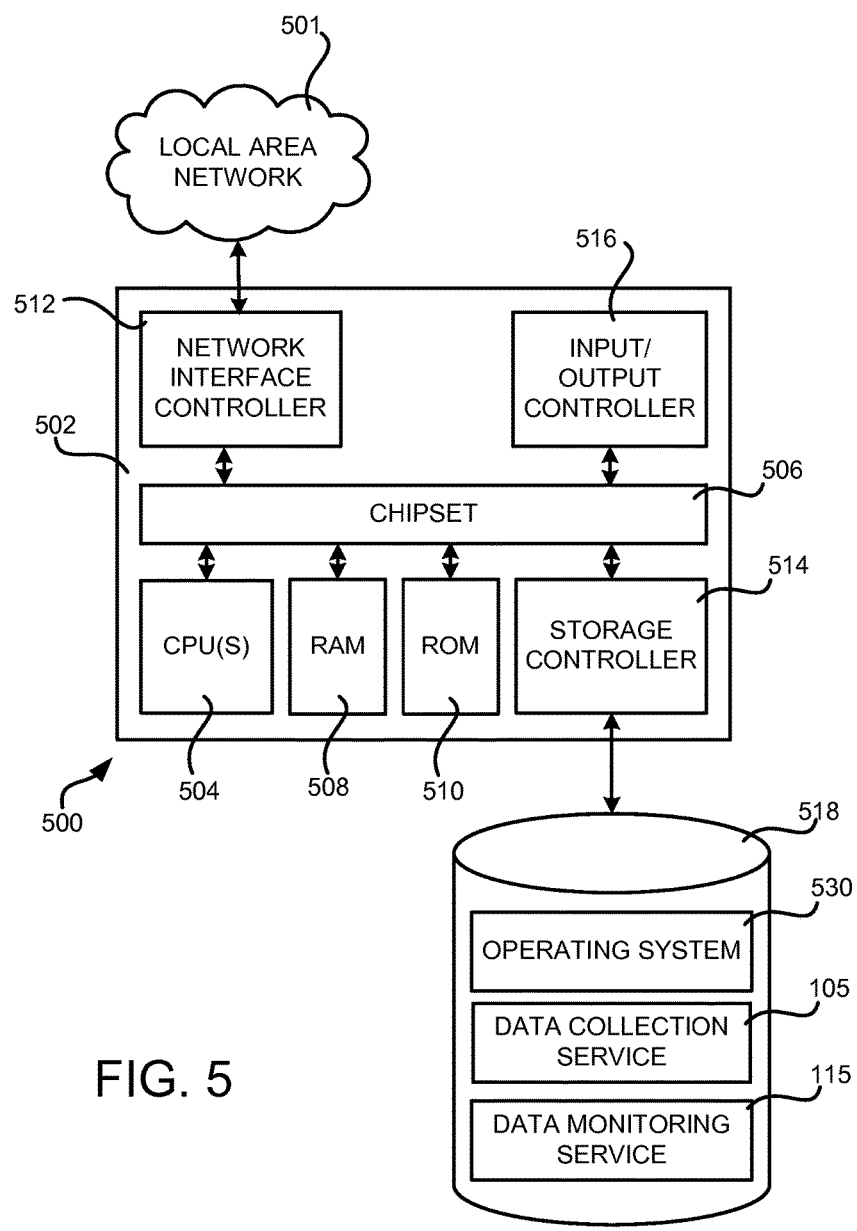
FIG. 5 is a computer architecture diagram showing an illustrative computer hardware architecture for implementing a computing device that might be utilized to implement aspects of the various embodiments presented herein.

FIG. 5 shows an example computer architecture for a computer 500 capable of executing program components in the manner described above. The computer architecture shown in FIG. 5 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 5 may be utilized to execute the methods 200, 300, or 400. The computer architecture shown in FIG. 5 might also be utilized to implement a portion of a service provider network 103 or any other of the computing systems described herein.

The computer 500 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the embodiments described herein.

The computer 500 may operate in a networked environment using logical connections to remote computing devices and computer systems through a network, such as the local area network 501. The chipset 506 may include functionality for providing network connectivity through a NIC 512, such as a gigabit Ethernet adapter. The NIC 512 is capable of connecting the computer 500 to other computing devices over the network 520. It should be appreciated that multiple NICs 512 may be present in the computer 500, connecting the computer to other types of networks and remote computer systems.

The computer 500 may be connected to a mass storage device 518 that provides non-volatile storage for the computer. The mass storage device 518 may store system programs, application programs, other program modules, and data, which have been described in greater detail herein. The mass storage device 518 may be connected to the computer 50 through a storage controller 514 connected to the chipset 506. The mass storage device 518 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 518 is characterized as primary or secondary storage, and the like.

For example, the computer 500 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 518 by detecting the physical states or characteristics of one or more particular locations within the physical storage units.

In addition to the mass storage device 518 described above, the computer 500 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 518 may store an operating system 530 utilized to control the operation of the computer 500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 518 may store other system or application programs and data utilized by the computer 500, such as the data monitoring service 115, the data collection service 105, and/or any of the other software components and data described above. The mass storage device 518 might also store other programs and data not specifically identified herein.

In one embodiment, the mass storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various routines described above with regard to FIGS. 2, 3, and/or 4. The computer 500 might also include computer-readable storage media for performing any of the other computer-implemented operations described herein.

The computer 500 may also include one or more input/output controllers 516 for receiving and processing input from a number of input devices, such as a keyboard, a mouse, a touchpad, a touch screen, an electronic stylus, or other type of input device. Similarly, the input/output controller 516 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for improving data quality and, potentially, other aspects of the operation of a data monitoring service or software module have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable non-transitory storage medium having computer-executable instructions stored thereon which, when executed by a computer, cause the computer to:
    extract a set of data metrics for data obtained through an access of a data storage target, the set of data metrics describing at least data usage metrics and data importance metrics for the data obtained through the access of the data storage target, the data importance metrics including a measure of cost of replacing the data obtained through the access of the data storage target;
    compute a set of data thresholds based on the importance metrics, the data thresholds including at least one quantitative threshold and at least one periodic threshold for the data obtained through the access of the data storage target;
    determine a data quality event has occurred based on the set of data thresholds;
    trigger an alert for the data quality event;
    receive feedback related to the alert; and
    adjust the set of data thresholds based on the received feedback.

2. The computer-readable non-transitory storage medium of claim 1, wherein determining the set of data metrics for the data obtained through the access of the data storage target comprises inspecting the data storage target to extract the data usage metrics and the data importance metrics, wherein the data usage metrics describe usage of the data obtained through the access of the data storage target, and wherein the data importance metrics describe importance of the data obtained through the access of the data storage target.

3. The computer-readable non-transitory storage medium of claim 2, wherein the data importance metrics further including at least one of information related to how often the data obtained through the access of the data storage target is accessed, information related to a level of interest for data obtained through the access of the data storage target, information related to a strategic importance for data obtained through the access of the data storage target, or how often data obtained through the access of the data storage target is acted upon.

4. The computer-readable non-transitory storage medium of claim 2, wherein computing a set of data thresholds based on the set of data metrics comprises:
- computing an importance score indicative of an overall importance of the data accessed at the data storage target, the importance score based on the data importance metrics;
- generating the at least one quantitative threshold based on the importance score; and
- generating the at least one periodic threshold based on the data usage metrics.

5. The computer-readable non-transitory storage medium of claim 1, wherein determining the data quality event has occurred comprises comparing individual data points for data obtained through the access of the data storage target to the at least one quantitative threshold based on a sliding time window established by the at least one periodic threshold.

6. The computer-readable non-transitory storage medium of claim 1, wherein triggering an alert for the data quality event comprises at least one of:
- generating an alert message; or
- automated data cleansing of at least a portion of the data obtained through the access of the data storage target.

7. A method for improving the quality of stored data, the method comprising:
- extracting, by a computer, a set of data metrics for data obtained through an access of a plurality of data storage targets, the set of data metrics describing at least data usage metrics and data importance metrics for the data obtained through the access of the plurality of data storage targets, the data importance metrics including a measure of cost of replacing the data obtained through the access of the data storage target;
- computing, by the computer, a set of data thresholds based on the importance metrics for the data obtained through the access of the plurality of data storage targets, the data thresholds including at least one quantitative threshold and at least one periodic threshold for the data obtained through the access of the plurality of data storage targets;
- determining, by the computer, a data quality event has been approached based on the set of data thresholds;
- adjusting, by the computer, the set of data thresholds responsive to determining the data quality event has been approached; and
- monitoring the data obtained through the access of the plurality of data storage targets.

8. The method of claim 7, wherein the data obtained through the access of the plurality of data storage targets comprises at least one of customer purchase data, network page view data, product catalog data, search query data, application data, webpage data, user clickstream data, and computer usage data.

9. The method of claim 7, further comprising determining, by the computer, the set of data metrics, wherein determining the set of data metrics comprises:
- inspecting, by the computer, the plurality of data storage targets to extract data usage metrics, the data usage metrics describing usage of the data obtained through the access of the plurality of data storage targets; and
- inspecting, by the computer, the plurality of data storage targets to extract data importance metrics, the data importance metrics describing importance of the data obtained through the access of the plurality of data storage targets.

10. The method of claim 9, wherein the data importance metrics further include at least one of information related to how often the data obtained through the access of the plurality of data storage targets is accessed, information related to a level of interest for the data obtained through the access of the plurality of data storage targets, information related to a strategic importance of data obtained through the access of the plurality of data storage targets, or how often the data obtained through the access of the plurality of data storage targets is acted upon.

11. The method of claim 7, wherein computing, by the computer, the set of data thresholds based on the set of data metrics comprises:
- computing, by the computer, an importance score indicative of an overall importance of the data obtained through the access of accessed at the plurality of data storage targets;
- generating, by the computer, the at least one quantitative threshold based on the importance score; and
- generating, by the computer, the at least one periodic threshold based on at least usage of the data obtained through the access of the plurality of data storage targets or the data obtained through the access of the plurality of data storage targets.

12. The method of claim 7, wherein the at least one quantitative threshold includes a threshold value for comparing with data obtained through the access of the plurality of data storage targets and the at least one periodic threshold includes a sliding time window for performing the comparison.

13. The method of claim 7, wherein determining, by the computer, the data quality event has occurred comprises comparing individual data points for data obtained through the access of the plurality of data storage targets to the at least one quantitative threshold based on a sliding time window established by the at least one periodic threshold.

14. The method of claim 7, further comprising:
- determining, by the computer, the data quality event has occurred based on the set of data metrics;
- receiving, by the computer, feedback related to the data quality event in response to determining that a data quality event has occurred; and
- triggering, by the computer, an alert for the data quality event responsive to determining the data quality event has occurred, wherein the received feedback is based on whether the triggered alert is a false-positive alert.

15. A system, comprising:
- a first computing hardware system providing a data storage target configured to store data and
- a second computing hardware system executing a data monitoring service configured to:
  - monitor the data storage target;
  - update a set of data metrics for data accessed by way of the data storage target, the set of data metrics describing data usage metrics and an importance metrics of the data accessed by way of the data storage target, the importance metrics of the data accessed by way of the data storage target including a measure of cost of replacing the data accessed by way of the data storage target;
  - update a set of data thresholds based on the importance metrics, the set of data thresholds including at least one quantitative threshold and at least one periodic threshold for the data accessed by way of the data storage target; and
  - determine a data quality event has occurred, for the data accessed by way of the data storage target, based on the set of data thresholds and a false-positive rate of data quality event alerts.

16. The system of claim 15, wherein the data monitoring service is further configured to stabilize the false-positive rate of the data quality event alerts to within a predetermined range.

17. The system of claim 15, wherein the at least one quantitative threshold includes a threshold value for performing a comparison, and wherein the at least one periodic threshold includes a sliding time window for performing the comparison.

18. The system of claim 15, wherein the data monitoring service is further configured to:
  identify a previous data quality event matching the data quality event within a predetermined threshold; and
  associate information about the previous data quality event with an alert message for the data quality event.

* * * * *